Dec. 29, 1964 L. T. FIKE 3,162,898
APPARATUS FOR USE IN RETREADING TIRES
Filed Oct. 29, 1959 3 Sheets-Sheet 1
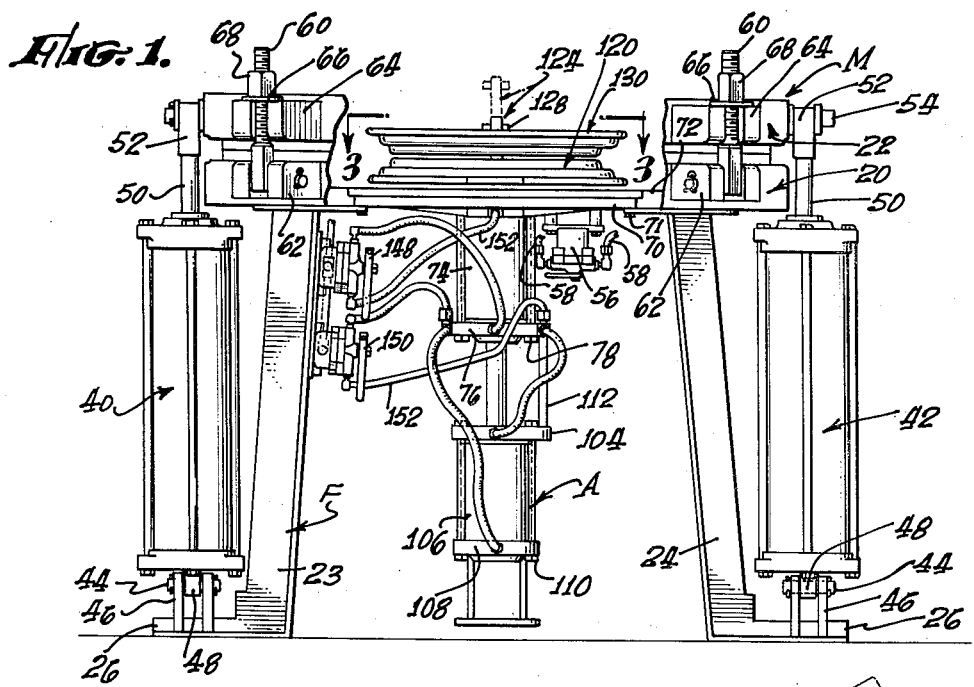
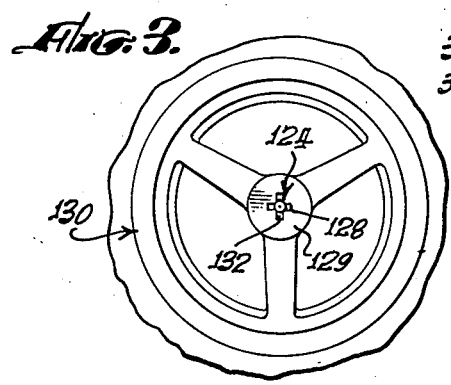
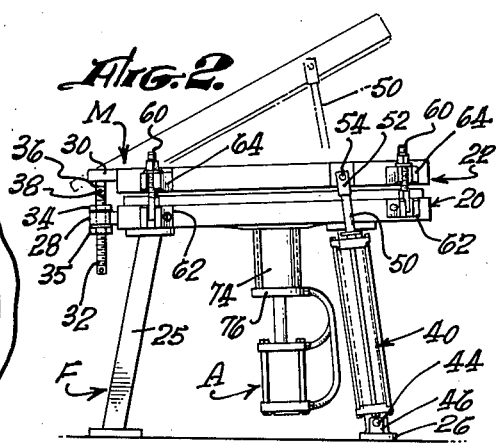
INVENTOR.
LOUIS T. FIKE,
BY
Fulwider, Mattingly & Huntley,
ATTORNEYS.

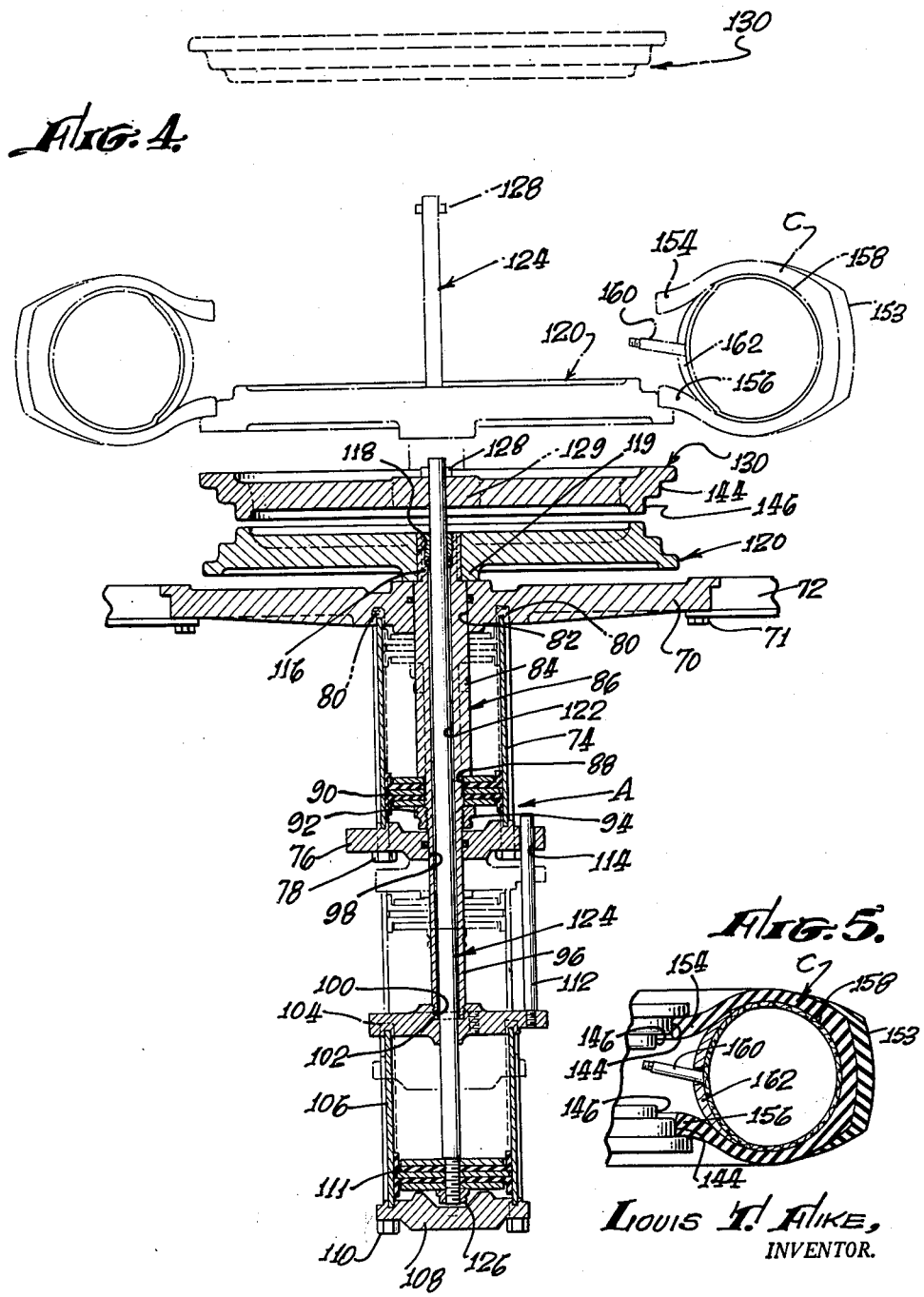

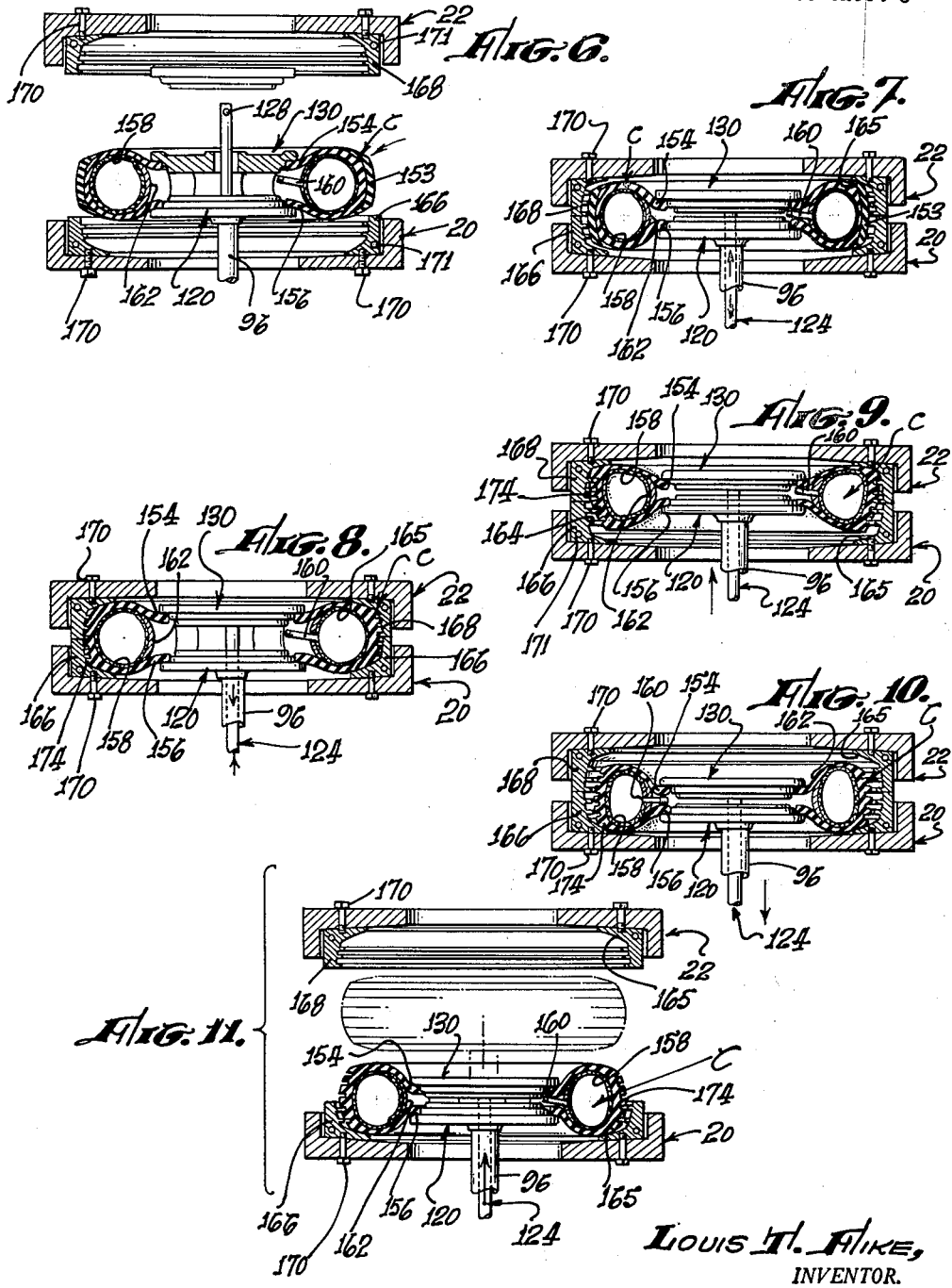

3,162,898
APPARATUS FOR USE IN RETREADING TIRES
Louis T. Fike, Los Angeles, Calif., assignor, by mesne assignments, to Super Mold Corporation of California, Lodi, Calif., a corporation of California
Filed Oct. 29, 1959, Ser. No. 849,550
12 Claims. (Cl. 18—18)

The present invention relates generally to tire retreading apparatus and is particularly directed to apparatus which will consistently provide retreaded tires having uniform treads.

Generally, in retreading a worn tire casing the outer surface of such casing is first buffed with a wire brush or the like. Then a band of unvulcanized rubber is adhered upon the outer periphery of the tire casing and the latter is positioned within the matrix of a mold. The mold imparts heat to the casing so as to bond the unvulcanized band thereto, with the radially inwardly extending ribs of the matrix also forming treads in the band during the heating operation.

A representative mold usable with the apparatus embodying the present invention includes upper and lower halves that are pivotally connected at their rear portions. Each half is provided with a matrix half, the latter respectively engaging the upper and lower portions of the casing during the heating operation. The diameter of the cavity defined by the upper and lower matrix halves corresponds to the outer diameter of the retreaded tire with the matrix ribs extending radially inwardly beyond the outer diameter of the unvulcanized band. The apparatus of the present invention serves to initially reduce the diameter of the casing in order that the latter may be positioned wtihin the confines of the cavity defined by the matrix in exact horizontal alignment with the matrix. This eliminates any possibility of the casing being positioned crookedly relative to the matrix. It has been determined that misalignment of the casing relative to the matrix as the casing is positioned within the matrix cavity is a primary cause of crooked treads in the completed retread. The two halves of the mold are locked against vertical separation during the heating operation by suitable lock means. The aforementioned reduction in casing diameter provided by the present apparatus also permits these lock means to be readily applied to the mold halves. During the heating operation the apparatus of the present invention positively maintains the casing properly aligned with the matrix so as to assure uniform treads on the completed tire. After the casing has been heated so as to form the treads thereon, the apparatus of the present invention serves to break the casing loose from the matrix halves in order that the completed retreaded tire may be readily removed from the matrix. Finally, this apparatus lifts the upper mold half free of the lower mold half and thereafter effects upward ejection of the completed retreaded tire from the lower matrix half.

It is a major object of the present invention to provide novel and improved apparatus for use with a heating mold in retreading a tire.

A further object of the present invention is to provide apparatus of the aforedescribed nature adapted to effect relative radial and vertical movement of a casing relative to a matrix during a tire retreading operation.

An additional object of the present invention is to provide apparatus for use with a retreading mold having upper and lower halves, with such apparatus effecting movement of the upper mold half relative to the lower half as well effecting radial and vertical movement of the casing relative to the mold's matrix.

A further object is to provide apparatus of the aforedescribed nature which permits the mold havles to be locked together by lock means without requiring a separate press for exerting a squeezing force upon such mold halves.

It is another object of the present invention to provide apparatus of the aforedescribed nature which is relatively simple of construction and rugged of design whereby it may afford a long and trouble-free service life.

Yet an additional object of the present invention is to provide apparatus of the aforedescribed nature which is economical and foolproof of operation, and which affords a considerable savings in the time required to effect a tire retreading operation.

These and other objects and advantages of the present invention will become apparent from the following detailed description when taken in conjunction with the appended drawings wherein:

FIGURE 1 is a front elevational view of a preferred form of apparatus embodying the present invention;

FIGURE 2 is a side elevational view in reduced scale showing said apparatus;

FIGURE 3 is a top plan view of a top bead ring utilized in said apparatus;

FIGURE 4 is a central vertical cross-sectional view showing the tire casing engaging portion of said apparatus;

FIGURE 5 is a fragmentary vertical sectional view showing a tire casing to be retreaded by said apparatus and an air bag utilized to hold such casing expanded within a matrix; and FIGURES 6 through 11 are central vertical sectional views showing the mode of operation of said apparatus.

Referring to the drawings and particularly FIGURES 1 and 2 thereof, a preferred form of apparatus embodying the present invention includes a mold M having a fixed lower half 20 and a movable upper half 22. The lower mold half 20 is rigidly affixed to the upper end of a frame F having plurality of legs (preferably three) designated 23, 24 and 25. The lower portion of the legs are provided with horizontally extending feet 26. The rear portion of the lower mold half 20 is formed with a lug 28. The lug 28 is in vertical alignment with a complementary lug 30 formed on the upper mold half 22 when the two halves are in overlying relationship. The lug 28 supports the lower portion of a generally vertically extending externally threaded adjustment post 32, with adjustment nuts 34 and 35 being provided for such post immediately above and below this lug. The upper portion of the adjustment post 32 is hingedly affixed to a pin 36 that depends from the lug 28 by a horizontal pin 38 whereby the upper mold half 22 may have its front end pivoted upwardly to the open position shown in phantom outline in FIGURE 2. The adjustment post 32 permits the spacing between the upper and lower mold halves to be adjusted to compensate for the particular thickness of the tire matrix utilized with the mold M.

Inasmuch as the upper mold half 22 is of heavy construction, power-operated means are provided to effect movement of the upper mold half between its closed position shown in solid outline in FIGURE 2 and its open position shown in phantom outline therein. Such power-operated means takes the form of a pair of air operated cylinder and piston units 40 and 42 disposed at opposite sides of the front legs 23 and 24. The lower end of each cylinder is pivotally affixed to the foot 26 of its respective leg by means of horizontally extending pivot pins 44. The pivot pins 44 extend between upstanding bifurcations 46 formed on each foot and a depending ear 48 formed at the lower central portion of each cylinder. A piston rod 50 extends upwardly out of each of the cylinders and piston units. The upper end of each piston rod 50 is affixed to a bearing element 52. Both bearing elements pivotally receive a horizontally extending pin 54, with such pins extending horizontally outwardly from the opposite sides of the upper mold half 22. Air is admitted to and discharged from cylinder and piston units 40 and 42 by conventional means. Thus, there is provided a three-way valve 56 connected to a source of pressurized air (not shown). This valve 56 is mounted at the front right-hand portion of the lower mold half 20 at a point spaced below such lower mold half. The valve 56 is connected to the upper and lower ends of the cylinders and piston units by suitable flexible conduits 58.

It generally requires approximately 45 minutes for a casing to be cured within the mold M. Accordingly, it is desirable to use means other than the cylinder and piston units 40 and 42 to maintain the upper mold half 22 locked tightly against the lower mold half 20 during the curing operation. Accordingly, suitable lock means such as a plurality of lock bolts 60 are interposed between the upper and lower mold halves. The lower ends of the lock bolts 60 are pivotally mounted between radially extending bifurcations 62 formed on the periphery of the lower mold half 20. The intermediate portion of these lock bolts 60 are received between complementary bifurcations 64 which extend radially outwardly from the upper mold half 22. The bifurcations 62 and 64 are rigidly affixed at their radially inner ends to their respective mold halves. The upper portion of each lock bolt 60 is adapted to receive a washer 66 and a nut 68. When the lock bolts 60 are swung upwardly to their position shown in FIGURE 1, the nuts 68 will be tightened so as to lock the upper mold half 20 against upward separation from the lower mold half 20. Various other lock means may be utilized in lieu of the aforedescribed, as for example, a circumferential clamp of the type shown in Patent No. 2,903,742, issued September 15, 1959.

The apparatus of the present invention also includes aligner unit A that is centrally disposed relative to the mold M. Referring now additionally to FIGURES 3 and 4, the adapter unit A includes an adapter disc 70, the radially outer end of which is rigidly affixed by bolts 71 to horizontally extending arms 72 formed on the upper end of the legs 23, 24 and 25. The adapter disc 70 is therefore fixed relative to the frame F. An upper, fixed fluid cylinder 74 depends coaxially from the adapter disc 70. The lower end of this upper cylinder 74 is closed by means of a closure plate 76. This closure plate 76 is held fixed relative to the lower end of the upper cylinder by means of a plurality of vertically extending tie bolts 78, the upper ends of such tie bolts being threaded into sockets 80 formed in the adapter disc 70.

The adapter disc 70 is centrally formed with a bore 82. This bore 82 slidably receives the upper portion 84 a vertically extending, generally tubular shaft, generally designated 86. The intermediate portion of this shaft 86 is formed with a recess 88 for receiving an upper piston 90. This piston 90 is vertically slidably disposed within the upper cylinder 74. The lower end of the piston 90 is retained in place by means of a retaining nut 92, the latter engaging threads 94 formed on the shaft 86 below the recess 88. The portion of the shaft 86 below the threads 94 is of reduced diameter as compared to the upper portion 84 of the shaft. This lower shaft portion 96 vertically slidably extends through a coaxial bore 98 formed in the closure plate 76. The lower end of the shaft 86 is formed with threads 100. These threads 100 are engaged with complementary threads formed in a socket 102 that is coaxial with a plug 104. The plug 104 defines the upper closure of a lower fluid cylinder 106. The lower end of the lower cylinder 106 is closed by a bottom closure plate 108. The bottom closure plate 108 is held in place by means of a plurality of tie bolts 110. The upper ends of these tie bolts 110 are threadably received by the plug 104. A lower piston 111 is vertically slidably disposed within the lower cylinder 106.

The plug 104 is rigidly affixed to the lower end of a plurality of upstanding guide rods 112. The guide rods 112 are vertically slidably received within complementary guide holes 114 formed in the radially outer portion of the bottom closure plate 108. With this arrangement, vertical reciprocation of the shaft 86 will be directly transferred to the lower cylinder 106 whereby the latter will undergo reciprocation concurrently with the shaft.

The upper end of the shaft 86 is formed with a neck 116. This neck 116 telescopically receives the coaxial bore 118 formed in the hub 119 of a lower bead wheel 120. Accordingly, vertical movement of the shaft 86 will be directly transferred to this lower bead wheel 120.

The bore 122 of the tubular shaft 86 vertically slidably receives a rod generally designated 124. The lower end of this rod 124 is affixed to the lower piston 111 by means of a nut 126.

The upper end of the rod 124 is formed with a rigid stop pin 128 that extends radially outwardly from opposite sides of the rod. The upper end of the rod 124 is removably engageable with the hub 129 of a lower bead wheel 120. Thus, referring to FIGURE 3 the hub 129 is provided with a horizontally extending slot 132 that is of slightly larger dimensions than the stop pin 128. Accordingly, when the slot 132 is aligned with the stop pin 128 the hub 129 may be lowered over the upper end of the rod. There after, the upper bead wheel may be rotated 90 degrees to its position shown in FIGURE 3 and downward movement of the rod 124 will then be transmitted to the upper bead wheel 130.

Preferably, the upper and lower bead wheels 120 and 130 will be usable with two or more tire casing sizes. Accordingly, as indicated in FIGURES 4 and 5, each bead wheel is formed with a first annular groove 144 adapted to receive a first tire size, as for example, a 15 inch tire. Radially inwardly of each groove 144 is formed a second annular groove 146 of lesser diameter. This second groove 146 is adapted to receive a smaller diameter tire, as for example, a 14 inch tire.

Air is supplied to the interior of the upper and lower cylinders 74 and 106 by means of a pair of conventional air valves 148 and 150, respectively. As indicated in FIGURE 1, these air valves 148 and 150 may be rigidly affixed to the leg 23 of the frame F. These air valves receive pressurized air from a suitable source (not shown). The air valves 148 and 150 are connected to the upper and lower interiors of the upper and lower cylinders 74 and 106 by suitable flexible conduits 152 in a conventional manner.

In the operation of the aforedescribed apparatus the casing C to be retreaded and its adhered unvulcanized band 153 is first positioned upon the lower bead wheel 120. At this time the upper bead wheel 130 will not be disposed upon the rod 124, as indicated by the phantom outline in FIGURE 4. Additionally, it is preferable that the rod 124 be in a lowered position so as to facilitate positioning the casing C upon the lower bead wheel. After the casing C has ben positioned upon the lower bead wheel, the upper bead wheel may be slipped downwardly over the upper end of the rod 124 by aligning the stop pin 128 with the slot 132. Thereafter, the upper bead wheel 130 is rotated 90 degrees to its position of FIGURE 3. At this time the beads 154 and 156 of the casing C will be disposed within the annular grooves 144 of the upper and lower bead wheels. A conventional air bag 158 having a valve stem 160 is disposed within the casing C prior to the time that the top bead wheel 130 is attached to the rod 124. A conventional curing ring 162 encircles the radially inwardly facing portion of the air bag 158.

Next, the top bead wheel 130 is caused to move downwardly by admitting pressurized air to the upper portion of the lower cylinder 106. During downward movement of the upper bead wheel 130, the lower bead wheel 120 will be maintained in its elevated position of FIGURE 6. Accordingly, the beads 154 and 156 will be squeezed together whereby the outer diameter of the casing C will be reduced. The upper and lower bead wheels are then moved downwardly while remaining in their closely spaced relationship whereby the casing C will be positioned within the matrix halves, the outer periphery of the casing C clearing the ribs 164 of the matrix halves. After the casing C has been disposed within the matrix cavity 165, the flow of pressurized air to the upper and lower cylinders may be discontinued. The upper bead wheel 130 is then rotated 90 degrees so as to release it from the upper end of the rod 124. Pressurized air is then admitted to the upper interior of the upper cylinder 74 so as to pull the lower bead wheel 120 downwardly away from the casing.

The matrix halves 166 and 168 are rigidly supported within the lower and upper mold halves 20 and 22, respectively, as by means of a plurality of bolts 170. During a casing curing operation these matrix halves will be heated by suitable means to a temperature approximating 300 degrees F. This heat may be provided by means of steam tubes 171 extending through the matrix halves. Alternately, electric resistant heating elements may be utilized in conjunction with the matrix halves to effect this heating.

Referring to FIGURE 7, at such time as the casing C has been positioned within the lower matrix half 166 the upper mold half 22 will be lowered so as to place the upper matrix 168 in abutment with the lower matrix half. This may be accomplished by means of the aforedescribed cylinder and piston units 40 and 42. It is next necessary to lock the upper and lower mold halves together by means of the aforedescribed lock bolts 60. This is preferably accomplished while the casing C is still maintained in its reduced diameter position of FIGURE 7. In this regard, with the casing in its reduced diameter position the upper matrix half 168 will readily abut the lower matrix half 166. It is therefore unnecessary to supply special press means for effecting such abutment as the mold halves are being locked together.

Referring now to FIGURE 8, after the lock bolts 60 have been manipulated so as to rigidly secure the mold halves together the upper and lower bead wheels 120 and 130 will undergo vertical separation. Accordingly, the casing C will return to its normal relaxed diameter. Thereafter, the matrix halves 166 and 168 will be heated to curing temperature.

At the conclusion of the curing operation it is necessary to loosen the treads 174 formed in the retreaded tire from the matrix ribs 164. To accomplish this the upper bead wheel 130 is first rotated 90 degrees to its position of FIGURE 3. Thereafter, as indicated in FIGURE 9, the lower bead wheel 120 is moved upwardly so as to effect concurrent upward movement of the lower casing bead 154. During such upward movement of the lower bead wheel 120, the upper bead wheel 130 is locked against upward movement. The upward movement of the lower bead wheel is effected by admitting pressurized air to the lower interior of the upper cylinder 74. The upper bead wheel may be locked against upward vertical movement by admitting pressurized air into the upper interior of the lower cylinder 106. The lower interior of the lower cylinder 106 contains air existing at a lower pressure at this time, and hence the lower cylinder 106 may move upwardly while the lower piston 111 and rod 124 remain stationary. The upward movement of the lower bead wheel will continue until the force from the pressurized air is exceeded by the resistance of the lower casing bead 154 against further upward movement, as indicated clearly in FIGURE 9. The upward movement of the casing beads 154 and 156 serves to pull the treads 174 formed in the lower half of the casing free of the matrix ribs 164 of the lower matrix half 166.

Next, it is necessary to break the treads 174 on the upper half of the casing C free of the matrix ribs 164. This may be accomplished by initially lowering the upper bead wheel 130 towards the lower bead wheel 120 while the lower bead wheel remains fixed against downward movement. This may be accomplished by admitting pressurized air to the lower interior of the upper cylinder 74 and increasing the amount of pressurized air being admitted to the upper interior of the lower cylinder 106. This serves to squeeze the casing beads 154 and 156 together. With the casing beads held in this squeezed-together relationship, both wheels may be moved upwardly. Thus, as indicated in FIGURE 10, the upper portion of the casing C will be broken free of the matrix with the treads 174 being pulled away from the matrix ribs 164.

Referring now to FIGURE 10, after the casing C has been broken free of the matrix ribs 164, the upper and lower bead wheels will continue to exert a squeezing pressure on the casing beads 154 and 156. Accordingly, the casing will remain in its reduced-diameter condition. The upper mold half 22 may then be raised by means of the cylinder and piston units 40 and 42. Thereafter, the completed casing may be ejected upwardly from its solid outline position of FIGURE 11 to its phantom outline position therein by means of the upper and lower bead wheels. In this regard these bead wheels will continue to exert a squeezing pressure on the casing beads 134 and 156 whereby the outer diameter of the casing will be maintained less than that of the matrix ribs 164. The completed casing may be readily removed from the apparatus by initially removing the upper bead wheel 130 from the rod 124.

It will be apparent that the aforedescribed movements of the upper and lower bead wheels may be readily accomplished by proper manipulation of the air valves 148 and 150 whereby these valves will admit or discharge pressurized air from the upper and lower cylinders 75 and 106. It should also be particularly noted that the apparatus of the present invention will consistently provide retreaded casings having uniform treads. This is made possible because the casing will always be positioned in horizontal alignment with the matrix as the casing is disposed within the matrix cavity. Additionally, such results are made possible because the treads in the retreaded casing are completely broken-away from the matrix ribs prior to the time that the casing is ejected from the matrix. The aforedescribed apparatus moreover permits the retreading operation to be carried out with a minimum amount of labor and the least expenditure of time.

Various modifications and changes may be made with regard to the foregoing detailed description without departing from the spirit of the present invention or the scope of the following claims.

I claim:

1. Tire casing retreading apparatus, comprising:

a frame;

a full capping type mold on said frame, said mold being formed with a cavity that receives a tire to be retreaded over its outer periphery and outer side walls;

a lower bead wheel coaxial with said cavity and engageable with the lower side of said tire casing;

first support means secured to said lower bead wheel;

first power-operated means on said frame secured to said first support means and operable to urge said lower bead wheel vertically in both directions relative to said mold cavity under power;

an upper bead wheel coaxial with said cavity and engageable with the upper side of said tire casing with said bead wheels when disposed in close vertical proximity effecting the reduction in diameter of said tire casing to less than the diameter of said mold cavity;

second support means;

readily detachable connection means between said upper bead wheel and said second support means;

and second power-operated means carried by said frame secured to said second support means and operable to urge said upper bead wheel vertically in both directions relative to said mold cavity under power either concurrently with or independently of said lower bead wheel.

2. Apparatus as set forth in claim 1 wherein said power-operated means are of the fluid-actuated type.

3. Tire casing retreading apparatus, comprising: a frame; a full capping type mold on said frame, said mold being formed with a cavity that receives a tire to be retreaded over its outer periphery and outer side walls; a lower bead wheel coaxial with said cavity and engageable with the lower side of said tire casing; a vertical shaft secured to said lower bead wheel; first power-operated means on said frame secured to said vertical shaft and operable to urge said lower bead wheel vertically in both directions relative to said mold cavity under power; an upper bead wheel coaxial with said cavity and engageable with the upper side of said tire casing, with said bead wheels when disposed in close vertical proximity effecting the reduction in diameter of said tire casing to less than the diameter of said mold cavity; a vertical rod; readily detachable connection means between said upper bead wheel and said rod; and second power-operated means carried by said frame secured to said rod and operable to urge said upper bead wheel vertically in both directions relative to said mold cavity under power either concurrently with or independently of said lower bead wheel.

4. Apparatus as set forth in claim 3 wherein said shaft is hollow and said rod is slidably telescopically disposed within said shaft.

5. Apparatus as set forth in claim 3 wherein said power-operated means are of the fluid-actuated type.

6. Tire casing retreading apparatus, comprising: a frame; a mold on said frame, said mold being formed with a cavity that receives a tire to be retreaded over its outer periphery and outer side walls; a lower bead wheel coaxial with said cavity and engageable with the lower side of said tire casing; a hollow vertical shaft secured to said lower bead wheel; fluid-actuated cylinder and pistol means on said frame secured to said shaft and operable to urge said lower bead wheel vertically in both directions relative to said mold cavity under power; an upper bead wheel coaxial with said cavity and engageable with the upper side of said tire casing, with said bead wheels when disposed in close vertical proximity effecting the reduction in diameter of said tire casing to less than the diameter of said mold cavity; a vertical rod telescopically vertically slidably disposed within said shaft; readily detachable connection means between said upper bead wheel and said rod; and second fluid-actuated cylinder and piston means carried by said frame secured to said rod and operable to urge said upper bead wheel vertically in both directions relative to said mold cavity under power either concurrently with or independently of said lower bead wheel.

7. Tire casing retreading apparatus, comprising: a frame; a lower mold half fixed relative to said frame and formed with a lower cavity half that receives a tire casing to be retreaded over its outer periphery and outer side walls; an upper mold half movably attached to said lower mold half whereby it may be raised thereabove to receive said casing, said upper mold half being formed with an upper cavity half coaxial with said lower cavity half during a molding operation; power-driven means operatively interposed between said frame and said upper mold half to raise the latter relative to said lower mold half; releasable lock means securing said lower and upper mold halves together; a lower bead wheel coaxial with said cavity halves and engageable with the lower side of said casing; first support means secured to said lower bead wheel; first power-operated means on said frame secured to said first support means and operable to urge said lower bead wheel vertically in both directions relative to said power cavity under power; an upper bead wheel coaxial with said lower cavity and engageable with the upper side of said casing, with said upper and lower bead wheels when disposed in close vertical proximity effecting the reduction in diameter of said tire casing to less than the diameter of said cavity halves; second support means connected to said upper bead wheel; and second power-operated means carried by said frame secured to said second support means and operable to urge said upper bead wheel vertically in both directions relative to said lower cavity under power either concurrently with or independently of said lower bead wheel.

8. Apparatus as set forth in claim 7 wherein said first support means includes a vertical hollow shaft and said second support means includes a vertical rod telescopically slidably disposed within said shaft.

9. Apparatus as set forth in claim 7 wherein said power-operated means are of the fluid-actuated type.

10. In tire casing retreading apparatus that includes a fixed frame, and a full capping type mold on said frame formed with a cavity that receives a tire casing to be retreaded over its outer periphery and outer side walls, the combination of: a lower bead wheel coaxial with said cavity and engageable with the lower side of said tire casing; a vertical shaft secured to said lower bead wheel; first power-operated means on said frame operable to urge said shaft vertically in both directions under power whereby said lower bead wheel is movable from within said cavity to a point exterior of said cavity; and upper bead wheel coaxial with said cavity and engageable with the upper side of said casing, with said upper and lower bead wheels when disposed in close vertical proximity effecting the reduction in diameter of said tire casing to less than the diameter of said cavity; a vertical rod removably secured to said upper bead wheel; and second power-operated means operatively supported on said frame connected to said rod and operable to urge said upper bead wheel vertically in both directions relative to said cavity under power either concurrently with or independently of said lower bead wheel.

11. Apparatus as set forth in claim 10 wherein said power-operated means include coaxial fluid-actuated cylinder and piston means.

12. Apparatus as set forth in claim 11 wherein said shaft is hollow and said rod is slidably telescopically disposed within said shaft.

References Cited by the Examiner

UNITED STATES PATENTS

| 2,272,231 | 2/42 | Voth | 18—18 |
|---|---|---|---|
| 2,302,133 | 11/42 | Maze | 18—18 |
| 2,697,853 | 12/54 | Smyser | 18—18 |
| 2,728,945 | 1/56 | Clapp | 18—18 |
| 2,734,225 | 2/56 | Glynn | 18—18 |
| 2,812,547 | 11/57 | Duerksen et al. | 18—18 |
| 2,915,783 | 12/59 | Fassero et al. | 18—18 |
| 2,921,337 | 1/60 | Frohlich et al. | 18—45 |
| 2,948,924 | 8/60 | Clapp | 18—18 |
| 2,987,770 | 6/61 | Powell | 18—18 |

References Cited by the Applicant

UNITED STATES PATENTS

| 1,662,035 | 3/28 | Smith et al. |
|---|---|---|
| 1,750,867 | 3/30 | Smith et al. |
| 2,443,955 | 6/48 | Guzik. |
| 2,593,137 | 4/52 | Glynn. |
| 2,639,466 | 5/53 | Glynn. |
| 2,672,651 | 3/54 | Smyster. |
| 2,835,921 | 5/58 | White. |
| 2,866,228 | 12/58 | French. |
| 2,936,484 | 5/60 | Lawson. |
| 2,942,295 | 6/60 | Duerksen et al. |

MICHAEL V. BRINDISI, *Primary Examiner.*

WILLIAM J. STEPHENSON, *Examiner.*